United States Patent
Fumia, Jr. et al.

[15] 3,652,288
[45] Mar. 28, 1972

[54] DYES AND PHOTOGRAPHIC EMULSIONS AND ELEMENTS CONTAINING SAID DYES

[72] Inventors: Arthur Fumia, Jr.; Donald W. Heseltine, both of Rochester, N.Y.

[73] Assignee: Eastman Kodak Company, Rochester, N.Y.

[22] Filed: July 20, 1970

[21] Appl. No.: 56,653

[52] U.S. Cl..............................96/129, 96/120, 96/142, 260/240.3
[51] Int. Cl..................G03c 1/08, G03c 1/18, C09b 23/100
[58] Field of Search ..........................96/129, 102, 142, 120; 260/240.3

[56] References Cited

UNITED STATES PATENTS 1,942,824    6/1930    Brooker..................................96/129

Primary Examiner—Norman G. Torchin
Assistant Examiner—Alfonso T. Suro Pico
Attorney—W. H. J. Kline and W. E. Neely

[57] ABSTRACT

Novel polymethine cyanine dyes are derived from certain enamines containing a cyclohexene ring having a reactive methylene or methyl substituent thereon. These dyes are spectral sensitizers for photographic silver halide emulsions and sensitize such emulsions up to wavelengths ranging about from 550 to 770 mu. Many of the dyes are useful sensitizers for the red to near infrared regions of the spectrum.

12 Claims, No Drawings

DYES AND PHOTOGRAPHIC EMULSIONS AND ELEMENTS CONTAINING SAID DYES

This invention relates to novel cyanine dyes, and more particularly to dyes with a partially cyclized polymethine bridge derived from enamines containing a cyclohexene ring, and to photographic materials, particularly spectrally sensitized photographic silver halide emulsions and photographic elements, prepared therewith.

It is well known that dyes of the cyanine class sensitize photographic silver halide emulsions. However, this class includes whole groups which have no sensitizing properties or which even have a desensitizing effect. The number of sensitizers that can be used in practice is further limited by inability in many cases to meet the strict requirements of the photographic art as to clearness and storage ability, as well as freedom from fogging, in photographic layers and elements prepared with such sensitizers. Furthermore, the gradation in both the fresh and in the aged condition must have the required value and must not change. These requirements are especially applicable to sensitizers for color photographic processes, which in addition need to have a particularly high sensitizing action and also a special selectivity.

We have now found that certain enamines containing a cyclohexene ring having a reactive methylene or methyl substituent thereon give polymethine dyes having a partially cyclized polymethine bridge, that fully satisfy the above mentioned requirements of an advantageous and effective spectral sensitizer, and thus provide a new class of excellent spectral sensitizers for photographic silver halide emulsions. These new dyes sensitize such emulsions up to wavelengths ranging about from 550 to 770 mu, with maximum sensitivities ranging about from 525 to 745 mu. Thus, many of our new polymethine dyes have proven to be excellent sensitizers for the red to near infrared regions of the spectrum. In general, the dyes of the invention cause only very low fog level in emulsions, both fresh and on incubation. A particularly effective and useful dye compound of our invention is that of Example 9 herein, namely, 4-[3-(5,5-dimethyl-3-N-pyrrolidinyl-2-cyclohexenylidene) propenyl]-1-ethylquinolinium perchlorate, including other salt compounds thereof, and is the preferred species.

It is, accordingly, an object of our invention to provide a new class of polymethine dyes that function as spectral sensitizers in photographic silver halide emulsions. Another object is to provide novel light absorbing dyes that are useful in photographic filter layers. Another object is to provide novel photographic elements prepared with our new class of dyes. A further object is to provide means for preparing these new dyes and novel photographic materials of the invention. Other objects will become apparent from a consideration of the general description and the appended claims.

The new polymethine dyes of our invention are in the form of their quaternary (acid anion) salts and include a symmetrical dye represented by the following general formula:

I.
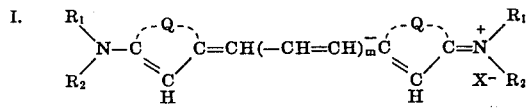

an unsymmetrical dye represented by the following general formula:

II.
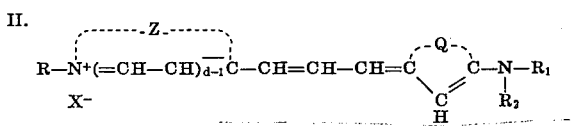

and a styryl dye represented by the following general formula:

III.
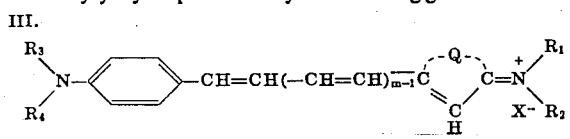

wherein $d$ and $m$ represents a positive integer of from 1 to 2, Q represents the atoms necessary to complete a cyclohexene ring, R represents an alkyl group, preferably a lower alkyl group containing from one to four carbon atoms, e.g., methyl, ethyl, propyl, isopropyl, butyl, pentyl, hexyl, heptyl, octyl, nonyl, decyl, undecyl, dodecyl, etc., a substituted alkyl group, preferably a substituted lower alkyl group, such as a hydroxyalkyl group, e.g., β-hydroxyethyl, β-hydroxypropyl, γ-hydroxypropyl, ω-hydroxybutyl, etc., an alkoxyalkyl group, e.g., β-methoxyethyl, β-ethoxyethyl, β-propoxyethyl, β-butoxyethyl, γ-methoxypropyl, γ-ethoxypropyl, ω-methoxybutyl, ω-ethoxybutyl, ω-butoxybutyl, etc., a carboxyalkyl group, e.g., carboxymethyl, β-carboxyethyl, γ-carboxypropyl, ω-carboxybutyl, etc., a sulfoalkyl group, e.g., β-sulfoethyl, γ-sulfopropyl, ω-sulfobutyl, etc., a sulfatoalkyl group, e.g., β-sulfatoethyl, γ-sulfatopropyl, γ-sulfatobutyl, ω-sulfatobutyl, etc., an alkanoyloxyalkyl group, e.g., β-acetoxyethyl, β-propionyloxyethyl, β-butyryloxyethyl, γ-acetoxypropyl, ω-acetoxybutyl, ω-propionyloxybutyl, ω-butyryloxybutyl, etc., an alkoxycarbonylalkyl group, e.g., β-methoxycarbonylethyl, β-ethoxycarbonethyl, β-propoxycarbonylethyl, β-butoxycarbonylethyl, γ-methoxycarbonylpropyl, γ-ethoxycarbonylpropyl, ω-methoxycarbonylbutyl, ω-ethoxycarbonylbutyl, ω-butoxycarbonylbutyl, etc., an allyl group, an aralkyl group, e.g., benzyl, phenethyl, etc., or an aryl group, e.g., phenyl, o-tolyl, m-tolyl, p-tolyl, xylyl, o-chlorophenyl, m-chlorophenyl, p-chlorophenyl, o-carboxyphenyl, m-carboxyphenyl, p-carboxyphenyl, etc., $R_1$ represents independently a hydrogen atom or a lower alkyl group, e.g., methyl, ethyl, propyl, isopropyl, butyl, etc., $R_2$ represents independently a lower alkyl group, methyl, ethyl, propyl, isopropyl, butyl, etc., or an aryl group, e.g., phenyl, o-tolyl, m-tolyl, p-tolyl, xylyl, o-chlorophenyl, m-chlorophenyl, p-chlorophenyl, o-carboxyphenyl, m-carboxyphenyl, p-carboxyphenyl, etc., $R_1$ and $R_2$, collectively, with the nitrogen atom to which they are attached represent the residue of a secondary heterocyclic amine, e.g., 1-pyrrolidinyl, 1-piperidyl, 1-indolinyl, $R_3$ and $R_4$ each represents an alkyl group, preferably a lower alkyl containing from 1 to 4 carbon atoms, e.g., methyl, ethyl, propyl, isopropyl, butyl, hexyl, octyl, decyl, dodecyl, etc., X represents an acid anion, e.g., chloride, bromide, iodide, thiocyanate, sulfamate, perchlorate, benzenesulfonate, p-toluenesulfonate, methyl sulfate, ethyl sulfate, etc., and Z represents the nonmetallic atoms necessary to complete a 5- to 6-membered heterocyclic nucleus selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.); a benzothiazole nucleus (e.g., benzothiazole, 4-chlorobenzothiazole, 5-chlorobenzothiazole, 6-chlorobenzothiazole, 7-chlorobenzothiazole; 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.); a naphthothiazole nucleus (e.g., α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.); a thianaphtheno-7',6',4,5-thiazole nucleus (e.g., 4'-methoxythianaphtheno-7'-6',4,5-thiazole, nucleus (e.g., 4-methoxythianaphtheno-7'-6', 4,5-thiazole,etc.); an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.); benzoxozole nucleus (e.g., benzoxazole 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 6-chlorobenzoxazole, 6-methoxybenzoxazole, 5-hydroxybenzoxazole, 6-hydroxybenzoxazole, etc.); a naphthoxazole nucleus (e.g., α-naphthoxazole, β-naphthoxazole, etc.); a selenazole nucleus (e.g., 4-methylselenazole, 4-phenylselenazole, etc.); a benzoselenazole nucleus (e.g., benzoselenazole, 5-chlorobenzoselenazole, 5-methoxybenzoselenazole, 5-hydroxybenzoselenazole, tetrahydrobenzoselenazole, etc.); a naphthoselenazole nucleus (e.g., α-naphthoselenazole, β-naphthoselenazole, etc.); a thiazoline nucleus (e.g., thiazoline 4-methylthiazoline, etc.); a 2-quinoline nucleus (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.); a 4-quinoline nucleus (e.g., quinoline, 6-methoxyquinoline, 7-methylquinoline, 8-methylquinoline, etc.); a 1-isoquinoline nucleus (e.g., isoquinoline, 3,4-dihydroisoquinoline, etc.); a 3-isoquinoline nucleus (e.g., isoquinoline, etc.); a 3,3-dialkylindolenine nucleus (e.g., 3,3-dimethylindolenine, 5- or 6-nitro-3,3-dimethyl- or 5- or 6-cyano-3,3-dimethylindolenine, 3,3,5-trimethylindolenine, 3,3,7-trimethylindolenine, etc.), a 2-pyridine nucleus (e.g., pyridine, 3-methylpyridine, 4-methylpyridine, 5-methylpyridine, 3,4-dimethylpyridine, 4-chloropyridine, 3-hydroxypyridine, 3-phenylpyridine, etc.); a 4-pyridine nucleus (e.g., 2-methylpyridine, 3-methylpyridine, 3-chloropyridine, 2,6-dimethylpyridine, 3-hydroxypyridine, etc.); a 1-alkylimidazole nucleus (e.g., 1-methylimidazole, 1-ethyl-4-phenylimidazole, 1-butyl-4,5-dimethylimidazole, etc.); a 1-alkylbenzimidazole nucleus (e.g., 1-methylbenzimidazole, 1-butyl-4-methylbenzimidazole, 1-ethyl-5,6-dichlorobenzimidazole, etc.), and a 1-alkylnaphthimidazole nucleus (e.g., 1-ethyl-α-naphthimidazole, 1-methyl-β-naphthimidazole, etc.).

The new polymethine dyes of the invention can be conveniently prepared in a number of ways. For example, the symmetrical dyes of Formula I above are prepared to advantage by heating a mixture of an enamine compound of the formula:

IV.

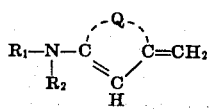

wherein Q, $R_1$ and $R_2$ are as previously defined with (a)a dialkoxymethyl acetate, e.g., diethoxymethyl acetate, to form the dye compounds wherein $m$ is 1, or with (b) β-anilinoacroleinanil hydrochloride, to form the dye compounds wherein $m$ is 2, in the proportions of about 2 moles of the enamine to each mole of (a) or (b), as illustrated by Examples 3 and 4 herein.

The unsymmetrical polymethine dyes of Formula II above are prepared by heating a mixture of a compound of Formula IV above with a compound of the formula:

V.

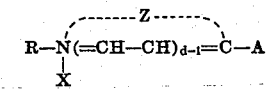

wherein d, R, X and Z are as previously defined, and A represents the group

—(CH CH)$_q$—NR$_5$R$_6$

wherein $q$ represents a positive integer of from 1 to 2, $R_5$ represents a hydrogen atom or an acyl group, e.g., acetyl, propionyl, butyryl, benzoyl, etc., and $R_6$ represents an aryl group, e.g., phenyl, tolyl, etc., in about equimolar proportions, as illustrated by Examples 1, 2, 4–9 and other examples herein.

The styryl dyes of Formula III above are prepared by heating a compound of Formulas IV or V with an aryl aldehyde of the formula:

VI.

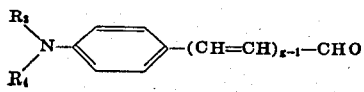

wherein $R_3$ and $R_4$ are as previously defined, and wherein $g$ represents a positive integer of from 1 to 2 in approximately equimolar proportions, as illustrated by Example 10 herein.

Adevantageously, the reaction mixtures are heated in an inert solvent medium such as N,N-dimethylacetamide, a lower alkanol such as ethanol, acetic anhydride, etc., or in mixtures thereof and, if desired, in the presence of a basic condensing agent such as a trialkylamine, e.g., triethylamine, tripropylamine, triisopropylamine, etc., N,N-dialkylanilines such as N,N-dimethylaniline, etc., N-alkylpiperidines such as N-methylpiperidine, etc., and the like. Preferably the reactions are carried out at refluxing temperatures of the reaction mixtures. On chilling or by addition of a nonsolvent, or both, the dye compounds separate from the mixtures and are purified by one or more recrystallizations with appropriate solvents. The reactants can be employed, when desirable, with a small excess of one or the other, i.e., greater than the stoichiometrically calculated equivalents. The preparation of certain cyclohexene compounds coming under Formula IV are described hereinafter. The heterocyclic intermediates represented by Formula V, as well as the aryl aldehydes of Formula VI, are well known substances, and methods for preparing these compounds are well known to the art.

3-Methyl-2-cyclohexene-1-one compounds which can be used in the preparation of the enamine compounds having the formula IV include 3,5-dimethyl-2-cyclohexene-1-one
3,4,6-trimethyl-5-hydroxy-2-cyclohexene-1-one
3,5,5-trimethyl-6-methoxy-2-cyclohexene-1-one
3-methyl-2-cyclohexene-1-one
3-methyl-5-benzoyl-2-cyclohexene-1-one
3,4-dimethyl-2-cyclohexene-1-one
3,5-dimethyl-6-phenyl-2-cyclohexene-1-one
3,6-dimethyl-5-phenyl-2-cyclohexene-1-one
3-methyl-5,6-diphenyl-2-cyclohexene-1-one
3,5,5,6-tetramethyl-2-cyclohexene-1-one
3,5,5-trimethyl-6-phenyl-2-cyclohexene-1-one, for example. The preparation of a number of 3-methyl-2-cyclohexene-1-one compounds is disclosed in German Pat. No. 1,088,949; Bull. Soc. Chim. France, pages 96–98 (1962) and J.A.C.S. Vol. 84, pages 2,625–28 (1962), for example. The manner in which 3-methyl-2-cyclohexene-1-one compounds can be used to prepare the enamine compounds having the formula IV is illustrated in Examples 18, 19 and 20, hereinafter.

The following examples further illustrate the new polymethine dyes and novel photographic materials of the invention.

Example 1 — 2-[3-(6-Ethoxycarbonyl-3N-pyrrolidinyl-2-cyclohexenylidene)propenyl]-3-ethylbenzoxazolium perchlorate

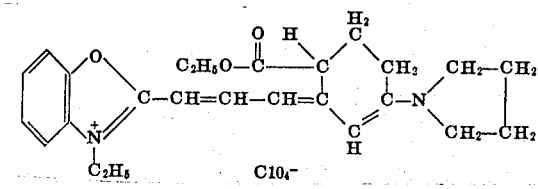

1-(4-Ethoxycarbonyl-3-methyl-2-cyclohexen-1-ylidenepyrrolidinium perchlorate (3.7 g.), 2-(2-acetanilidovinyl)-3-ethylbenzoxazolium iodide (4.3 g.), ethanol (20 ml.) and triethylamine (1.5 ml.) were placed in a flask and heated at reflux, with stirring, for 10 minutes. The reaction mixture was then chilled and the crude dye which precipitated was collected on a filter and then purified by recrystallizing once from methanol. 2.3 Grams (45 percent) of purified dye which melted at 124°–125° C. with decomposition were obtained.

Example 2 — 2-[3-(6-Ethoxycarbonyl-3-N-pyrrolidinyl-2-cyclohexenylidene)propenyl]-3-ethylbenzothiazolium perchlorate 1-(4-Ethoxycarbonyl-3-methyl-2-cyclohexen-1-ylidene) pyrrolidinium perchlorate (3.7 g.), 2-(2-Acetanilidovinyl)-3-ethylbenzothiazolium iodide (4.5 g.), ethanol (25 ml.) and triethylamine (1.5 ml.) were placed in a flask and heated at reflux, with stirring, for 10 minutes. The reaction mixture was then chilled and the crude dye which precipitated was collected on a filter and then purified by recrystallizing once from methanol. 3.2 grams (62 percent) of dye were thus obtained. The 3.2 grams of dye were redissolved in the methanol recrystallization liquors and the resulting solution was filtered through a bed of Norite. The filtrate was then brought to a boil and filtered. After chilling, the dye which precipitated was collected on a filter and dried. The yield of purified dye was 2.7 grams (52 percent), melting at 203°–204° C. with decomposition.

Example 3 — N-{5,5-Dimethyl-3-[3-(5,5-dimethyl-3N-pyrrolidinyl-2-cyclohexenylidene)propenyl]-2-cyclohexenylidene} pyrrolidinium perchlorate

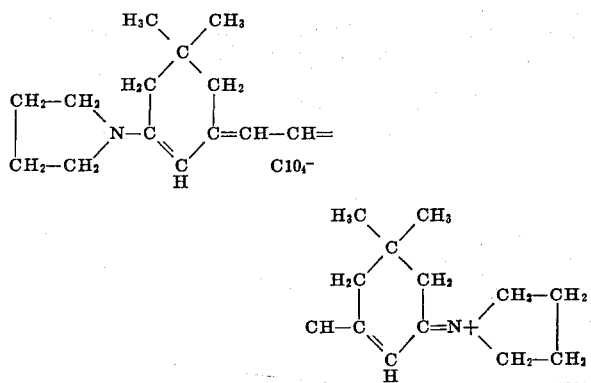

5,5-Dimethyl-3-methylene-1-(1-pyrrolidinyl)-1-cyclohexene (1.9 g., 2 mols) and diethoxymethyl acetate (6.4 g., 1 mol. + excess) were dissolved in N,N-dimethylacetamide (10 ml.) and heated on a steam bath for 20 min. A hot aqueous solution (10 ml.) of sodium perchlorate (2.4 g.) was added and the reaction allowed to heat on the steam bath an additional 5 minutes. The mixture was chilled, the crude product filtered, rinsed with ethanol and dried. After two recrystallizations from methanol, the yield of purified dye was 0.8 g. (32 percent), m.p. 217°–218° C. with decomposition.

Example 4 — N-{5,5-Dimethyl-3-[5-(5,5-dimethyl-3-N-pyrrolidinyl-2-cyclohexenylidene)-1,3-pentadienyl]-2-cyclohexenylidene} pyrrolidinium perchlorate

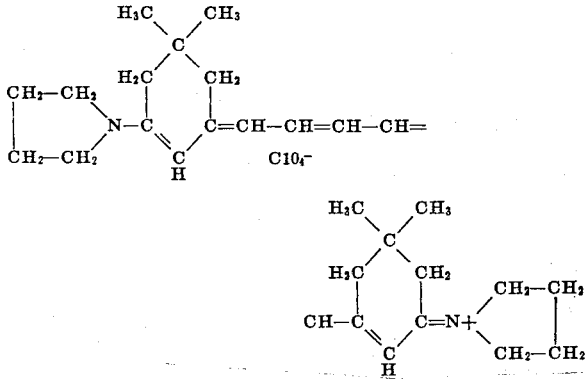

β-Anilinoacroleinanil hydrochloride (2.6 g., 1 mol.) and 5,5-dimethyl-3-methylene-1(1-pyrrolidinyl)-1-cyclohexene (5.7 g., 2 mols. + 50 percent excess) were dissolved in acetic anhydride (15 ml.) and stirred at room temperature until the initial heat of reaction had subsided. The mixture was then heated on a steam bath for 20 minutes, cooled to room temperature, and then an aqueous solution (10 ml.) of sodium perchlorate (2.4 g.) was added with stirring. The crude product was precipitated by the addition of ether (100 ml.) with stirring. After chilling, the crude dye was filtered, washed with water and dried. After two recrystallizations from ethanol, the yield of purified dye was 0.4 g. (8 percent), m.p. 191°–194° C. dec.

Example 5 — 2-[3(5,5-Dimethyl-3-N-pyrrolidinyl-2-cyclohexenylidene)propenyl]-3-ethylbenzoxazolium iodide 2-(2-Acetanilidovinyl)-3-ethylbenzoxazolium iodide (4.3 g., 1 mol.) and 5,5-dimethyl-3-methylene-1-(1-pyrrolidinyl)-1-cyclohexene (1.9 g., 1 mol.) were dissolved in ethanol (20 ml.) and heated under reflux for 5 minutes. After chilling, a small portion of the reaction mixture was stirred with ether to obtain some dye crystals. The reaction mixture was then seeded. After further chilling, the crude product was filtered and dried. After two recrystallizations from propanol, the yield of purified dye was 0.7 g. (14 percent), m.p. 245°–246° C. dec.

Example 6 — 2-[3-(5,5-Dimethyl-3-N-pyrrolidinyl-2-cyclohexenylidene)propenyl]-3-ethylbenzothiazolium iodide

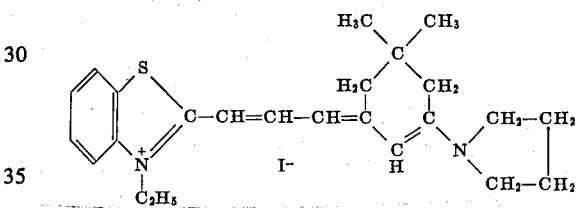

2-(2-Acetanilidovinyl)-3-ethylbenzothiazolium iodide (4.5 g., 1 mol.) and 5,5-dimethyl-3-methylene-1-(1-pyrrolidinyl)-1-cyclohexene (1.9 g., 1 mol.) were dissolved in ethanol (20 ml.) and heated under reflux for 5 minutes. After chilling, the crude product was collected and dried. After two recrystallizations from methanol, the yield of purified dye was 2.3 g. (45 percent), m.p. 277°–278° C. dec.

Example 7 — 2-[3(5,5-Dimethyl-3-N-pyrrolidinyl-2-cyclohexenylidene)propenyl]-3H-indolium iodide

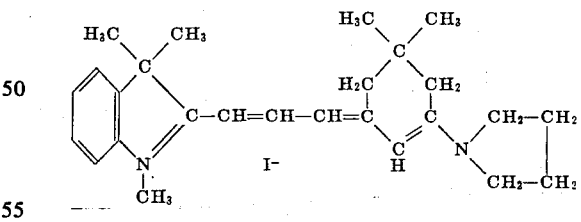

2-(2-Acetanilidovinyl)-1,3,3-trimethyl-3H-indolium iodide (4.5 g., 1 mol.) and 5,5-dimethyl-3-methylene-1-(1-pyrrolidinyl)-1-cyclohexene (1.9 g., 1 mol.) were dissolved in ethanol (20 ml.) and heated under reflux for 10 minutes. After chilling, the crude product was filtered and dried. After two recrystallizations from ethanol, the yield of purified dye was 2.6 g. (52 percent), m.p. 230°–231° C. dec.

Example 8 — 2-[3-(5,5-Dimethyl-3-N-pyrrolidinyl-2-cyclohexenylidene)propenyl]-1-ethylnaphtho[1,2-d]thiazolium iodide

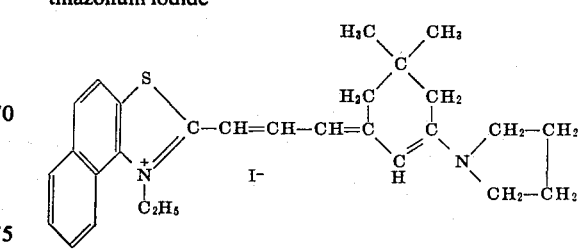

2-(2-Anilinovinyl)-1-ethylnaphth[1,2-d]thiazolium p-toluenesulfonate (5.0 g., 1 mol.) was mixed with ethanol (20 ml.). To this mixture was added acetic anhydride (0.6 ml., 1 mol. + 10 percent), triethylamine (1.5 ml., 1 mol. + 10 percent) and 5,5-dimethyl-3-methylene-1-(1-pyrrolidinyl)-1-cyclohexene (1.9 g., 1 mol.) in that order. The resulting mixture was heated under reflux for 10 minutes. To the hot reaction mixture, a hot aqueous solution of sodium iodide (2.0 g.) was added with stirring. After chilling, the crude product was filtered and dried. After two recrystallizations from methanol, the yield of purified dye was 0.4 g. (7 percent), m.p. 252°–253 °C. dec.

Example 9 — 4-[3-(5,5-Dimethyl-3-N-pyrrolidinyl-2-cyclohexenylidene)propenyl]-1-ethylquinolinium perchlorate

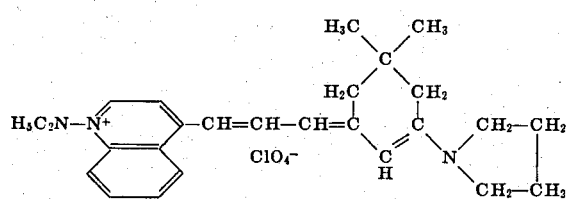

4-(2-Anilinovinyl)-1-ethylquinolinium iodide (4.0 g., 1 mol.) was mixed with ethanol (20 ml.). To this mixture was added acetic anhydride (0.6 ml., 1 mol. + 10 percent), triethylamine (1.5 ml., 1 mol. + 10 percent) and 5,5-dimethyl-3-methylene-1-(1-pyrrolidinyl)-1-cyclohexene (1.9 g., 1 mol.) in that order. The resulting mixture was heated under reflux for 20 minutes. To the warm reaction mixture, an aqueous solution (10 ml.) of sodium perchlorate (1.8 g.) was added. After chilling, a sticky solid separated. Ethanol (175 ml.) was added with stirring and crystalline crude product was obtained. The crude dye was collected and dried. After two recrystallizations from methanol, the yield of purified dye was 0.8 g. (17 percent), m.p. 213°–214°C. dec.

Example 10 — 1-(5,5-Dimethyl-3-p-dimethylaminostyryl-2-cyclohexenylidene)pyrrolidinium perchlorate

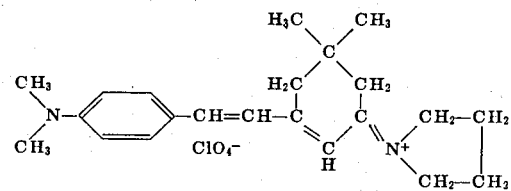

p-Dimethylaminobenzaldehyde (1.5 g., 1 mol.) and 5,5-dimethyl-3-methylene-1-(1-pyrrolidinyl)-1-cyclohexene (1.9 g., 1 mol.) were dissolved in ethanol and heated under reflux for several minutes. 50 percent Hydroiodic acid (3.2 g., 1 mol. + 20 percent) was added and the mixture heated under reflux for an additional 20 minutes. A hot aqueous solution (5 ml.) of sodium perchlorate (1.8 g.) was added.) After chilling, the crude product was filtered and dried. After two recrystallizations from acetic acid, the yield of purified dye was 0.4 g. (10 percent), m.p. 262°–263°C. dec.

Example 11 — 2-[3-(6-Ethoxycarbonyl-3-N-pyrrolidinyl-2-triethylamine
  cyclohexenylidene)propenyl]-1-ethylnaphtho
  [1,2-d]thiazolium perchlorate

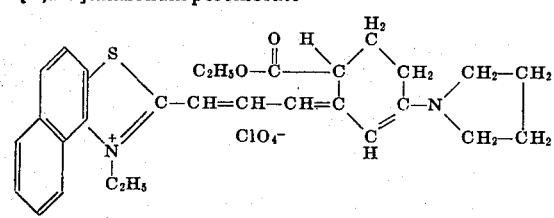

1-(4-Ethoxycarbonyl-3-methyl-2-cyclonexen-1-ylidene pyrrolidinium perchlorate (3.7 g.), 2-anilinovinyl-1-ethylnaphtho [1,2-d]5.0 g.), acetonitrile (25 ml.), acetic anhydride (1.0 ml.) and triethylamine (3.1 ml.) were placed in a flask and heated at reflux, with stirring, for 10 minutes. The reaction mixture was placed in a beaker, stirred and scratched to form crystals, and then chilled. The crude dye which precipitated was then collected on a filter and then purified by recrystallizing once from about 750 ml. of methanol, discarding some solid that did not dissolve. 1.8 Grams (32 percent) of purified dye which melted at 217°–218 °C. with decomposition were obtained.

Example 12 — 2-[3-(5,5-Dimethyl-3-N-indolinyl-2-cyclohexenylidene)propenyl]-1-ethylnaphtho[1,2-d]
  thiazolium perchlorate 2-(1-Anilinovinyl)-1-ethylnaphtho[1,2-d]thiazolium p-toluenesulfonate (2.5 g.), 1,5,5-trimethylcyclohexen-3-ylidene indolinium perchlorate (1.7 g.), acetic anhydride (0.5 ml.) triethylamine (1.5 ml. and ethanol (30 ml.) were placed in a flask and heated at reflux for 10 minutes. The reaction mixture was then chilled and the crude dye which precipitated was collected on a filter, rinsed with methanol and dried to obtain 2.6 g. (89 percent) of crude dye. The crude dye thus obtained was dissolved in cresol and methanol was added to precipitate the dye (1.9 g., 65 percent). The dye thus obtained was dissolved in cresol and methanol was added to precipitate the dye, which was extracted with hot methanol. 1.6 Grams (55 percent) of dye remained and was again extracted with about 150 ml. of hot methanol to obtain 1.3 g. (45 percent) of purified dye melting at 258°–259° C. with decomposition.

Example 13 — 4-[3(5,5-Dimethyl-3-N-indolinyl-2-cyclohexenyl
  idene)propenyl]-1-ethylquinolinium perchlorate

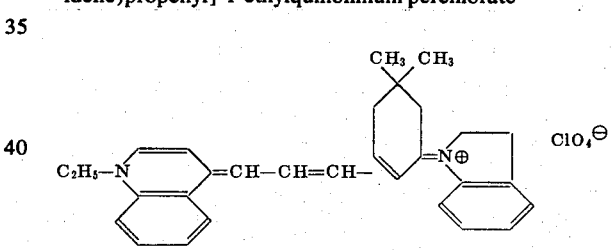

4-(2-Anilinovinyl)-1-ethylquinolinium iodide (2.0 g), 1,5,5-trimethylcyclohexen-3-ylidene indolinium perchlorate (1.7 g.), acetic anhydride (0.5 ml.), triethylamine (1.5 ml.), and ethanol (25 ml.) were placed in a flask and heated at reflux for 20 minutes. Upon chilling the reaction mixture tar along with some crystals came out. The reaction mixture was heated to reflux, stirred and scratched, allowed to cool slowly and then filtered, rinsed with methanol and dried. Weight 1.1 g. (42 percent). Upon recrystallization from 140 ml. of methanol 0.5 g. (19 percent) of dye was obtained. A further recrystallization from 100 ml. of methanol gave 0.3 g. (12 percent) of dye melting at 211°–212° C. with decomposition.

Example 14 — 2-[3(5,5-Dimethyl-3-N-indolinyl-2-cyclohexen
  ylidene)propenyl]-3-ethylbenzoxazolium perchlorate 2-(2Acetanilidovinyl)-3-ethylbenzoxazolium iodide (2.2 g.), 1,5,5-trimethylcyclohexen-3-ylidene indolinium perchlorate (1.2 g.), ethanol (25 ml.) and triethylamine (0.8 ml.) were placed in a flask and heated at reflux for 10 minutes. The reaction mixture was then chilled and the crude dye which precipitated was collected on a filter, rinsed with methanol and dried to obtain 1.8 g. (69 percent) of dye. Upon recrystallization from 250 ml. of methanol (0.8 g.) and further recrystallization from 150 ml. of methanol 0.4 g. (16 percent) of purified dye melting at 225°–226° C. with decomposition was obtained.

Example 15 — 2-[3-(5,5-Dimethyl-3-piperidino-2-cyclohexenyl
  idene)propenyl]-3-ethylbenzoxazolium perchlorate

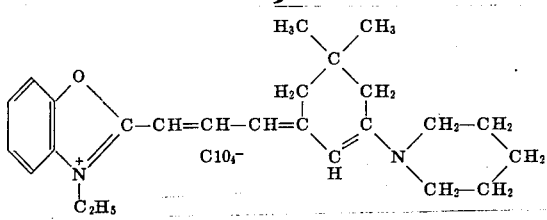

5,5-Dimethyl-3-methylene-1-(1-piperidyl)-1-cyclohexene (5.84 g., 1 mol. + 180 percent) and 2-β-acetanilidovinyl-3-ethylbenzoxazolium iodide (4.36 g., 1 mol.) were mixed in ethanol (20 ml.) and heated under reflux for 30 minutes. The mixture was then poured with stirring into a solution of sodium perchlorate (5 g.) in water (100 ml.) After chilling overnight, the crude dye was collected on a filter, washed with water and methanol and dried. After two recrystallizations from methanol, the yield of pure dye was 1.98 g. (41 percent), m.p. 163°–164° C. dec.

In place of the 2-β-acetanilidovinyl-3-ethylbenzoxazolium iodide in Example 15, there can be substituted any other of the mentioned quaternary salts coming within the scope of the invention such as the chloride, bromide, perchlorate, p-toluenesulfonate, methyl sulfate, etc. Also the above compound can be replaced with any of those of similar type defined by Formula V above, for example, with a 2-β-acetanilidovinyl-3-alkyl (e.g., methyl, ethyl, propyl, isopropyl, butyl, etc.) benzothiazolium quaternary salt (e.g., the chloride, bromide, iodide, perchlorate, p-toluenesulfonate, methyl sulfate, etc. salt), or with a 2-(2-acetanilidovinyl)-1-alkyl (e.g., methyl, ethyl, propyl, isopropyl, butyl, etc.)-3,3-dimethyl-3H-indolium quaternary salts (e.g., the chloride, bromide, iodide, perchlorate, benzenesulfonate, p-toluenesulfonate, methyl sulfate, etc. salt), or with a 2-(2-anilinovinyl)-1-alkyl (e.g., methyl, ethyl, propyl, isopropyl, butyl, etc.) naphtho[1,2-d]thiazolium quaternary salt (e.g., the chloride, bromide, iodide, perchlorate, p-toluenesulfonate, methyl sulfate, etc. salt), and the like, to give with the 5,5-dimethyl-3-methylene-1-(1-piperidyl)-1-cyclohexene the corresponding polymethine dye compounds having generally similar utility as sensitizers for photographic silver halide emulsions. Illustrative examples include 2-[ 3-(5,5-dimethyl-3-piperidino-2-cyclohexenylidene)propenyl]3-ethylbenzothiazolium perchlorate; 2-[3-(5,5-dimethyl-3-piperidino-2-cyclohexenylidene)propenyl]-1,3,3-trimethyl-3H-indolium iodide; 2-[3-(5,5-dimethyl-3-piperidino-2-cyclohexenylidene) propenyl]-1-ethylnaphtho[1,2-d]thiazolium iodide; and the like.

The dyes of the Examples 3–10 and 12–15 were tested in a silver bromoiodide emulsion containing 0.77 mole percent iodide of the type described by Trivelli and Smith, Phot. Journal, 79, 330 (1939). The dyes, dissolved in suitable solvents, were added to separate portions of the emulsions at the concentrations indicated. After digestion at 50° C. for 10 minutes, the emulsions were coated at a coverage of 432 mg. of silver/ft² on a cellulose acetate film support. A sample of each coating was exposed on an Eastman IB Sensitometer and to a wedge spectrograph, processed for three minutes in a developer of the following composition:

DEVELOPER

| | |
|---|---|
| N-methyl-p-aminophenol sulfate | 2.0 g. |
| Sodium sulfite (anhydrous) | 90.0 g. |
| Hydroquinone | 8.0 g. |
| Sodium carbonate (monohydrate) | 52.5 g. |
| Potassium bromide | 5.0 g. |
| Water to make | 1.0 liter | and then fixed, washed and dried. The sensitizing values obtained are shown in the following Table 1.

TABLE 1

| Dye of Ex. No. | Dye concentration (g./mole silver) | Type of emulsion | Sensitization range (mµ) to— | Sensitization maximum (mµ) |
|---|---|---|---|---|
| 3 | 0.04 | Bromoiodide | 760 | 710 |
| 4 | 0.10 | do | | |
| 5 | 0.04 | do | 660 | 600 |
| 6 | 0.04 | do | 710 | 640 |
| 7 | 0.04 | do | 660 | 620 |
| 8 | 0.04 | do | 750 | 675 |
| 9 | 0.04 | do | 770 | 725 |
| 10 | 0.04 | do | 670 | 575 |
| 12 | 0.02 | do | 750 | 720 |
| 13 | 0.02 | do | 770 | 745 |
| 14 | 0.02 | do | 690 | 655 |
| 15 | 0.04 | do | 650 | 615 |

Example 16 — 2-{3-[5,5-Dimethyl-3-(4-ethoxycarbonyl-1-piperazinyl)2-cyclohexenylidene]propenyl}-3-ethylbenzothiazolium perchlorate

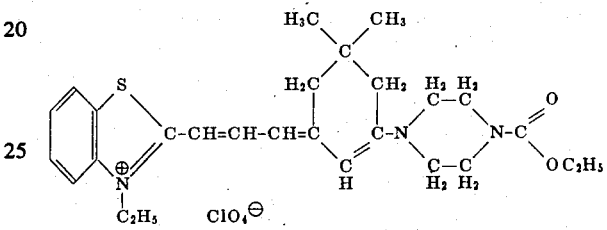

5,5-Dimethyl-3-methylene-1-(4-ethoxycarbonyl-1-piperazinyl)-1-cyclohexene (3.0 g.) and 2-(2-acetanilidovinyl)-3-ethylbenzothiazolium iodide (4.5 g.) were dissolved in ethanol (25 ml.) and heated at reflux for 5 minutes and then an aqueous solution (5.0 ml.) of NaCl₄ was added. The crude dye was collected on a filter and recrystallized twice from methanol. The still impure dye (3.16 g.) was dissolved in chloroform (200 ml.) at room temperature and the solution passed through norite. After evaporating to dryness, the yield of pure dye was 1.90 g (34%), m.p. 259°–260°C. dec.

Example 17 — 2-{3-[5,5-Dimethyl-3-(4-ethoxycarbonyl-1-piperazinyl)-2-cyclohexenylidene]propenyl}-3-ethylbenzoxazolium perchlorate

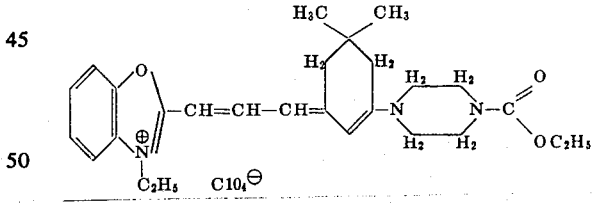

5,5-Dimethyl-3-methylene-1-(4-ethoxycarbonyl-1-piperazinyl)-1-cyclohexene (3.0 g.) and 2-(2-acetanilidovinyl)-3-ethylbenzoxazolium iodide (4.34 g.) were dissolved in ethanol (15 ml.) and heated at reflux for 5 minutes. Aqueous NaClO₄ (1.5 g. in 5 ml.) was added and, after chilling, the crude dye was collected on a filter. After one recrystallization from methanol, the yield of purified dye was 2.92 (53percent), m.p. 207–208°C dec.

The following examples illustrate the preparation of certain cyclohexene derivatives employed as intermediates in the preceding dye examples.

Example 18 — 5,5-Dimethyl-3-methylene-1-(1-pyrrolidinyl)-1-cyclohexene

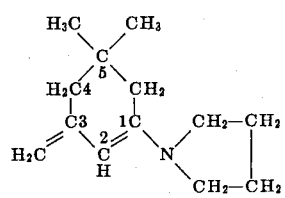

3,5,5-Trimethyl-2-cyclohexene-1-one (41.4 g., 1 mol) and pyrrolidine (32.0 g., 1 mol. + 50 percent) were dissolved in toluene (90 ml. and heated under reflux for 4 hours in an apparatus designed for the continuous removal of water. The toluene and excess pyrrolidine were then removed by distillation under reduced pressure and the residue distilled under vacuum. The yield of product was 40.0 g. (70 percent), b.p. 82°–83 C./0.2 mm. Hg.

Example 19 — 1,5,5-Trimethyl-3-phenylimino-1-cyclohexene

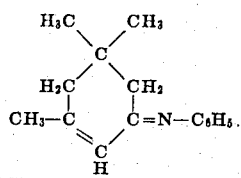

Isophorone (27.6 g., 1 mol), aniline (20.5 g., 1 mol. + 10 percent) and piperidine (1 ml.) were dissolved in xylene (50 ml.) and heated under reflux for 4 hours in an apparatus designed for the continuous removal of water. The mixture was distilled under reduced pressure and the fraction boiling 130°–160° C./12mm. was collected as a colorless oil. Yield 36,1 g., 85 percent.

Example 20 — 5,5-Dimethyl-3-methylene-1-(1-piperidyl)-1-cyclohexene

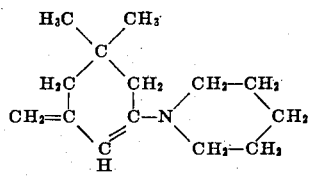

This compound can be prepared in 46 percent yield by the method of above Example 18 by replacing the pyrrolidine with piperidine.

Example 21 — 1-(4-Ethoxycarbonyl-3-methyl-2-cyclohexen-1-ylidene)-pyrrolidinium perchlorate

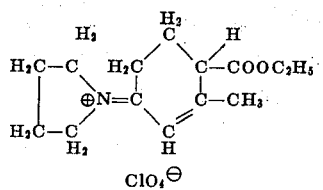

54.6 grams of 4-ethoxycarbonyl-3-methyl-2-cyclohexen-1-one, 38.0 ml. of pyrrolidine, 90 ml. of benzene and 0.5 gram of p-toluenesulfonic acid were placed in a apparatus defined for the continuous removal of $H_2O$ and heated at reflux with stirring for 45 minutes. The solvent was removed by evaporation under reduced pressure and the residue obtained was dissolved in about 1,200 ml. of ether and the resulting solution was treated with 72 percent perchloric acid with cooling until the reaction mixture was just acid. After chilling the reaction mixture was decanted and the residue obtained was stirred with a fresh 1 liter solution of ether and decanted. The residue obtained was dissolved in boiling ethanol and the solution was filtered while hot and then concentrated to about 250 ml. and cooled. The reaction mixture was then chilled and the desired product which precipitated was collected on a filter and dried. 76.0 Grams (75 percent) of product melting at 102°–103°C. were obtained.

Example 22 — 1,5,5-Trimethyl-2-cyclohexen-1-ylidene indolinium perchlorate

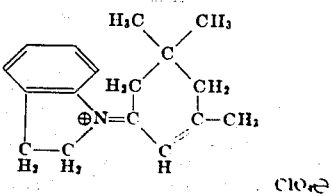

8.3 grams of 3,5,5-trimethyl-2-cyclohexen-1-one and 11 grams of indoline perchlorate were dissolved in 25 ml. of ethanol and then heated under reflux for 30 minutes. The reaction mixture was chilled and the desired product which precipitated was collected on a filter. This solid was made into a slurry with ethanol in a beaker and then filtered. The solid collected on the filter consisting of the desired product was dried. A yield of 9.8 grams (58 percent) of desired product was obtained.

Example 23 — 5,5-Dimethyl-3-methylene-1-(4-ethoxycarbonyl-1-piperazinyl)-1-cyclohexene

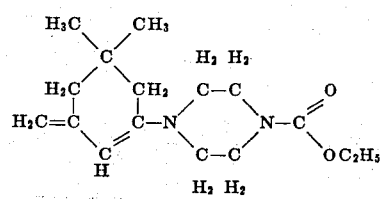

3,5,5-Trimethyl-2-cyclohexen-1-one (41.4 g), 1-ethoxycarbonylpiperazine (60.0 g.), p-toluenesulfonic acid (0.5 g.), and toluene (90 ml.) were placed in an apparatus designed for the continuous removal of water and heated at reflux for 8 hours. After removal of solvent, the residue was distilled in vacuum to obtain 46.6 g. (56 percent), b.p. 145°–153°C/0.1 mm. Hg. The dyes of Examples 1, 2, 11, 16 and 17 were tested in a 2.5 percent iodine silver bromoiodide emulsion with uniform cubic grains of 0.2 m. grain size. The emulsion samples were coated at 100 mg. Ag/ft.$^2$ and 694 g. gelatin/ft.$^2$ on a cellulose acetate film support. The film was exposed to a wedge spectrograph in an Eastman 1B Sensitometer, processed for 6 minutes in Kodak Rapid X-ray Developer, fixed, washed and dried.

TABLE 2

| Dye of Ex. No. | Dye concentration (g./mole silver) | Type of emulsion | Sensitization range (mμ) to— | Sensitization maximum (mμ) |
|---|---|---|---|---|
| 1 | 0.20 | Bromoiodide | 650 | 610 |
| 2 | 0.10 | do | 690 | 650 |
| 11 | 0.20 | do | 710 | 670 |
| 16 | .30 | do | 690 | 660 |
| 17 | .30 | do | 650 | 615 |

Other polymethine dyes of the invention having generally similar photographic sensitizing properties and applications and coming under the definitions of Formulas I, II, and III above, can be prepared in accordance with the procedures of the preceding Examples 1 to 17 by appropriate selection of intermediates from those defined by above Formulas IV to VII.

In the preparation of photographic emulsions, the new dyes of the invention are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive materials. Methanol, isopropanol, pyridine, etc., alone or in combination have proven satisfactory as solvents for the majority of our new dyes. The type of silver halide emulsions that are desensitized with our dyes include any of those prepared with hydrophilic colloids that are known to be satisfactory for dispersing light-sensitive silver halides, for example, emulsions prepared with hydrophilic colloids, such as, natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, and the like.

The concentration of our new dyes in the emulsion can be widely varied, i.e., generally from about 5 to about 100 mg. per liter of flowable emulsion. The specific concentration will vary according to the type of light-sensitive material in the emulsion and according to the effects desired. The most advantageous dye concentration for any given emulsion can be readily determined by making the tests and observations customarily used in the art of emulsion making. The emulsions are coated to advantage on any of the support materials used for photographic elements, for example, paper, glass, cellulose acetate, cellulose acetate-propionate, cellulose nitrate, polystyrene, polyesters, polyamides, etc.

To prepare a gelatino-silver halide emulsion sensitized with one of the new dyes, the following procedure is satisfactory: A quantity of the dye is dissolved in a suitable solvent and a volume of this solution containing from 5 to 100 mgs. of dye is slowly added to about 1,000 cc. of a gelatino-silver halide emulsion. With most of the new dyes, 10 to 20 mgs. of dye per liter of emulsion suffice to produce the maximum sensitizing effect with the ordinary gelatino-silver halides including silver chloride, bromide, bromoiodide, chlorobromide, chlorobromoiodide, etc. emulsions. With fine-grain emulsions, which include most of the ordinary employed gelatino-silver chloride emulsions and the like, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above statements are only illustrative and are not to be understood as limiting the invention in any sense, as it will be apparent that the new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of my invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Pat. No. to W. D. Baldsiefen 2,540,085, granted Feb. 6, 1951; R. E. Damschroder U.S. Pat. No. 2,597,856, granted May 27, 1952, and H. C. Yutzy et al., U.S. Pat. No. 2,597,915, granted May 27, 1952), various palladium compounds, such as palladium chloride (W. D. Baldsiefen U.S. Pat. No. 2,540,086, granted Feb. 6, 1951), potassium chloropalladate (R. E. Stauffer et al., U.S. Pat. No. 2,598,079, granted May 27, 1952), etc., or mixture of such sensitizers; antifoggants, such as ammonium chloroplatinate (A. P. H. Trivelli et al., U.S. Pat. No. 2,566,245, granted Aug. 28, 1951), ammonium chloroplatinite (A.P.H. Trivelli et al., U.S. Pat. No. 2,566,263, granted Aug. 28, 1951), benzotriazole, nitrobenzimidazole, 5-nitroindazole, benzidine, mercaptans, etc. (see Mees, "The Theory of the Photographic Process," Macmillan Pub., 1942, page 460), or mixtures thereof; hardeners, such as formaldehyde (A. Miller U.S. Pat. No. 1,763,533, granted June 10, 1930), chrome alum (U.S. Pat. No. 1,763,533), glyoxal (J. Brunken U.S. Pat. No. 1,870,354, granted Aug. 9, 1932, dibromacrolein (O. Block et al., British 406,750, accepted March 8, 1934), etc.; color couplers, such as those described in I. F. Salminen et al. U.S. Pat. No. 2,423,730, granted July 7, 1947, Spence and Carroll U.S. Pat. No. 2,640,776, issued June 2, 1953, etc.; or mixtures of such addenda. Dispersing agents for color couplers, such as those set forth in U.S. Pat. No. to E. E. Jelley et al., 2,322,027, granted June 15, 1943, and L. D. Mannes et al., U.S. Pat. No. 2,304,940, granted Dec. 15, 1942, can also be employed in the above-described emulsions. The dyes of this invention can be supersensitized with a sulfonated polynuclear aromatic supersensitizer, such as the supersensitizers described in Jones U.S. Pat. No. 2,947,630, issued Aug. 2, 1960, col. 3–6, e.g., Calcofluor White MR (a bis[s-triazin-2-ylamino]stilbene-2,2'-disulfonic acid, sodium salt) or with a silver halide reducing agent, such as ascorbic acid, piperidino hexose reductone, hydroquinone and, more generally, dihydroxy reducing agents such as the benzenes, gamma lactones, tetronimides, pyronimides, furans and pyrroles which contain at least two hydroxyl groups. A superadditive or synergistic effect can be obtained when emulsions containing a dye of the invention are supersensitized with a combination of sulfonated polynuclear aromatic supersensitizer and reducing agent. If desired, an azaindene, such as 4-hydroxy-6-methyl-1,-3,3a,7-tetrazaindene, can be added to emulsions supersensitized as described above, to reduce fog.

The dyes of this invention have higher speed in the spectrally-sensitized region than the somewhat related dyes of Belgian Pat. No. 674,800. Further, the dyes of this invention can be made without contamination by the bis dyes.

The dyes of this invention can be advantageously incorporated in print-out emulsions to improve the photographic properties of these emulsions. In one instance, dyes according to this invention can be used to improve the photographic properties of a radiation-sensitive silver halide emulsion comprising silver halide grains having polyvalent ions occluded therein, wherein said emulsion contains a halogen acceptor and which can optionally contain a stabilizer precursor.

The invention has been described in detail with particular reference to preferred embodiments thereof, but it will be understood that variations and modifications can be effected within the spirit and scope of the invention.

We claim:

1. A photographic silver halide emulsion containing a polymethine dye selected from the group consisting of a symmetrical dye represented by the following general formula:

I.
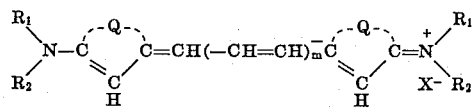

an unsymmetrical dye represented by the following general formula:

II.
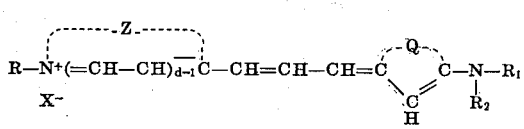

and a styryl dye represented by the following general formula:

III.
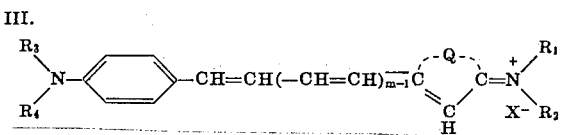

wherein $d$ and $m$ each represents a positive integer of from 1 to 2, Q represents the atoms necessary to complete a cyclohexene ring, R represents a member selected from the group consisting of an alkyl group, a hydroxyalkyl group, an alkoxyalkyl group, a carboxyalkyl group, a sulfoalkyl group, a sulfatoalkyl group, an alkanoyloxyalkyl group, an alkoxycarbonylalkyl group, allyl, an aralkyl group and a monocyclic aryl nucleus containing six nuclear carbon atoms, $R_1$ represents independently a member selected from the group consisting of a hydrogen atom and a lower alkyl group, $R_2$ represents independently a member selected from the group consisting of a lower alkyl group and a monocyclic aryl nucleus containing six nuclear carbon atoms, $R_1$ and $R_2$, collectively, with the nitrogen atom to which they are attached represent the residue of a secondary heterocyclic amine, $R_3$ and $R_4$ each represents an alkyl group, $X^-$ represents an acid anion, and Z represents the nonmetallic atoms required to complete a 5- to 6-membered heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-pyridine nucleus, a 4-pyridine nucleus, a 2-quinoline nucleus, a 4-quinoline nucleus, a 1-isoquinoline nucleus, a 3-isoquinoline nucleus, a 3,3-dialkylindolenine nucleus, an imidazole nucleus, a benzimidazole nucleus, and a naphthimidazole nucleus.

2. A photographic silver halide emulsion containing a polymethine dye in accordance with claim 1 having the formula I of claim 1.

3. A photographic silver halide emulsion containing a polymethine dye in accordance with claim 1 having the formula II of claim 1.

4. A photographic silver halide emulsion containing a polymethine dye in accordance with claim 1 having the formula III of claim 1.

5. A photographic silver halide emulsion containing a polymethine dye in accordance with claim 1 selected from the dye compounds consisting of 2-{3-[6-ethoxycarbonyl-3-(1-pyrrolidinyl)-2-cyclohexenylidene]propenyl}-3-ethylbenzoxazolium acid anion salt, 2-{3-[6-ethoxycarbonyl-3-(1-pyrrolidinyl)-2-cyclohexenylidene]propenyl}-3-ethyl-benzothiazolium acid anion salt, N-{5,5-Dimethyl-3-[3-(5,5-dimethyl-3-N-pyrrolidinyl-2-cyclohexenylidene)propenyl]-2-cyclohexenylidene}pyrrolidinium acid anion salt, N-{5,5-Dimethyl-3-[5-(5,5-dimethyl-3-N-pyrrolidinyl-2-cyclohexenylidene)-1,3-pentadienyl]-2-cyclohexenylidene}pyrrolidinium acid anion salt, 2-[3-(5,5-Dimethyl-3-N-pyrrolidinyl-2-cyclohexenylidene)propenyl]-3-ethylbenzoxazolium acid anion salt, 2-[3-(5,5-Dimethyl-3-N-pyrrolidinyl-2-cyclohexenylidene)propenyl]3-ethylbenzothiazolium acid anion salt, 2-[3-(5,5-Dimethyl-3-N-pyrrolidinyl-2-cyclohexenylidene)propenyl]-3H-indolium acid anion salt, 2-[3-(5,5-Dimethyl-3-N-pyrrolidinyl-2-cyclohexenylidene)propenyl]-1-ethylnaphtho[1,2-d]thiazolium acid anion salt, 4-[3-5,5-Dimethyl-3-N-pyrrolidinyl-2-cyclohexenylidene)propenyl]-1-ethylquinolinium acid anion salt, 1-(5,5-Dimethyl-3-p-dimethylaminostyryl-2-cyclohexenylidene)pyrrolidinium acid anion salt and 2-{3-[6-ethoxycarbonyl-3-(N-pyrrolidinyl)-2-cyclohexenylidene]-propenyl}-1-ethylnaphtho[1,2-d]thiazolium acid anion salt.

6. A photographic silver halide emulsion containing a polymethine dye in accordance with claim 1 wherein said dye is 4-[3-(5,5-Dimethyl-3-N-pyrrolidinyl-2-cyclohexenylidene)propenyl]-1-ethyl quinolinium perchlorate.

7. A photographic element comprising a support having thereon at least one layer containing a photographic silver halide emulsion of claim 1.

8. A photographic element comprising a support having thereon at least one layer containing a photographic silver halide emulsion of claim 2.

9. A photographic element comprising a support having thereon at least one layer containing a photographic silver halide emulsion of claim 3.

10. A photographic element comprising a support having thereon at least one layer containing a photographic silver halide emulsion of claim 4.

11. A photographic element comprising a support having thereon at least one layer containing a photographic silver halide emulsion of claim 5.

12. A photographic element comprising a support having thereon at least one layer containing a photographic silver halide emulsion of claim 6.

* * * * *